United States Patent [19]

Tazuke et al.

[11] 4,256,782

[45] Mar. 17, 1981

[54] TREATING METHOD FOR GIVING HYDROPHILIC PROPERTY TO THE SURFACE OF HYDROPHOBIC POLYMER SUBSTRATE

[75] Inventors: Shigeo Tazuke, Yokohama; Hitoshi Kimura; Hiroyuki Nakayama, both of Hiratsuka, all of Japan

[73] Assignee: Kansai Paint Co., Ltd., Japan

[21] Appl. No.: 947,024

[22] Filed: Sep. 29, 1978

Related U.S. Application Data

[63] Continuation of Ser. No. 802,010, May 31, 1977, abandoned.

[30] Foreign Application Priority Data

Jun. 4, 1976 [JP] Japan .............................. 51-65271

[51] Int. Cl.$^3$ .............................................. B05D 3/06
[52] U.S. Cl. .................................... 427/53.1; 427/54.1
[58] Field of Search .................................... 427/54, 53

[56] References Cited

U.S. PATENT DOCUMENTS

| | | | |
|---|---|---|---|
| 3,088,791 | 5/1963 | Cline et al. | 427/54 |
| 3,090,664 | 5/1963 | Cline et al. | 427/54 |
| 3,107,206 | 10/1963 | Cottet et al. | 427/54 |
| 3,188,165 | 6/1965 | Magat et al. | 427/54 |
| 3,453,195 | 7/1969 | Kuhne | 427/54 |
| 3,552,986 | 1/1971 | Bassemir et al. | 427/54 |
| 3,566,874 | 3/1971 | Shepherd et al. | 427/54 |
| 3,635,756 | 1/1972 | Shepherd et al. | 427/54 |

*Primary Examiner*—John H. Newsome
*Attorney, Agent, or Firm*—Ostrolenk, Faber, Gerb & Soffen

[57] ABSTRACT

A treating method for imparting hydrophilic property to the surface of a hydrophobic polymer substrate comprising the step of: contacting the surface of the polymer substrate having carbon atoms bonded with a single hydrogen atom in the molecule with a radically polymerizable compound and then irradiating actinic rays to the polymer substrate coated with the polymerizable compound. The homopolymer of the above polymerizable compound is soluble and/or swellable in water or in electrolytic solutions. If desired, the polymerizable compound may be mixed with a triplet state sensitizer having triplet state energy of 50 Kcal/mol or more or photosensitizer which produces free radicals by irradiation.

9 Claims, No Drawings

TREATING METHOD FOR GIVING HYDROPHILIC PROPERTY TO THE SURFACE OF HYDROPHOBIC POLYMER SUBSTRATE

This is a continuation application Ser. No. 802,010, filed May 31, 1977 now abandoned.

BACKGROUND OF THE INVENTION

This invention relates to a treating method for imparting hydrophilic property to the surfaces of hydrophobic polymer substrates having carbon atoms bonded with a single hydrogen atom in their molecules.

As the treating methods for imparting hydrophilic property to the surfaces of hydrophobic polymer substrates, there are several known methods such as corona discharge treatment and surface grafting treatment using radioactive rays. In the former corona discharge treatment, however, the hydrophilic property is insufficient so that the use of the method is restricted. In the latter method applying radioactive rays, the treatment becomes expensive since it be indispensable to employ safety measures. In addition, the polymer substrates themselves are subjected to some influences and their properties are causes to vary, and therefore, the disadvantage of narrow utility cannot be avoided.

BRIEF SUMMARY OF THE INVENTION

In view of the above, the present inventors have carried out eager and extensive studies on the treating method for imparting hydrophilic property to the surfaces of the above-mentioned hydrophobic polymer substrates having carbon atoms bonded with a single hydrogen atom in the molecule, which method is free from the disadvantages of the conventional art methods. As the result, the method of the present invention has been accomplished.

It is, therefore, the primary object of the present invention to provide an improved method for imparting hydrophilic property to the surfaces of hydrophobic polymer substrates which is free from the above disadvantages in the conventional art.

Another object of the present invention is to provide a treating method for imparting hydrophilic property to the surfaces of hydrophobic polymer substrates which is quite effective in operation but easy to be carried out.

In accordance with the method of the present invention, (A) a radically polymerizable compound, the homopolymer of which is soluble and/or swellable in water or in electrolytic solutions (hereinafter referred to as "polymerizable compound") is applied to the surface of (B) a hydrophobic polymer substrate having, in its molecules, carbon atoms bonded with a single hydrogen atom (hereinafter simply referred to as "hydrophobic polymer substrate" or "polymer substrate"), and then actinic rays are irradiated to the hydrophobic polymer substrate that is applied with the polymerizable compound.

In a further aspect of the invention, a triplet state sensitizer of 50 Kcal/mol or more in triplet state energy or a photosensitizer that produces free radicals by irradiation (hereinafter referred both sensitizers to as "sensitizer") can be added to the polymerizable compound before the latter is applied to the hydrophobic polymer substrate.

It is assumed that the treatment method of the present invention depends upon the addition reaction of a polymerizable compound to a hydrophobic polymer substrate caused by the free radical polymerization with the absorption of photo-energy. Further, in the method of the present invention, the selectivity to the wavelength of light rays is utilized and the addition reaction can be performed without causing any change in the hydrophobic polymer substrate.

DETAILED DESCRIPTION OF THE INVENTION

The hydrophobic polymer substrates referred to in the present invention are linear or cross-linked polymers having, in their molecules, 0.05 mol/kg or more carbon atoms bonded to a single hydrogen atom, and having a fixed form at room temperature. It is undesirable that the polymer substrates have carbon atoms bonded to a single hydrogen atom in conjugated double bonds since the velocity of addition of the polymerizable compound is too slow to those carbon atoms. Exemplified as these polymers are polystyrene, polypropylene, polyvinyl chloride, polyvinyl carbazole, polyacrylonitrile, polyacrylic esters, polyvinyl acetate, copolymers obtained with copolymerizing two or more of the monomers used for preparing the above polymers, double- or multiple-component copolymers obtained with copolymerizing one or more of the above monomers with the comonomers such as methacrylic esters, methacrylonitrile, butadiene, isoprene and ethylene, the internally cross-linked products of the above polymers, and branched polymers of ethylene, epoxy resin, unsaturated polyester, polyurethane comprising branched glycol as a part of alcohol component, and polyester comprising branched glycol as a part of alcohol component.

When the hydrophobic property of the surface is distinct, the effect of imparting hydrophilic property becomes large. In practice, it is preferred that a substrate having a contact angle of 60 degrees or more with water is used. Further, when carbon atoms having a single hydrogen atom are less than 0.05 mol/kg in the polymer molecules, the quantity of addition of the polymerizable compound becomes insufficient, so that the surface of the substrate is insufficiently imparted with a hydrophilic property.

Furthermore, in the present invention, the homopolymers of the above polymerizable compounds are soluble in water or in electrolytic solutions, and/or swellable by at least 10% by volume in water or in electrolytic solutions. Still further, the polymerizable compounds solely or together with sensitizers, causes a radical addition reaction when they are applied with radiation in the range of absorption wavelength. Exemplified as such compounds are one or the mixture of maleic anhydride, acrylamide, methacrylamide, N-methyl acrylamide and methacrylamide, N-ethyl acrylamide and methacrylamide, N-propyl acrylamide and methacrylamide, N-butyl acrylamide and methacrylamide, N-2-hydroxyethyl acrylamide and methacrylamide, N,N-methylene bisacrylamide and bismethacrylamide, N-methylol acrylamide, acryl morpholine, methacryl morpholine, N-propyloxy acrylamide, N,N-dimethyl acrylamide and methacrylamide, N,N-diethyl acrylamide and methacrylamide, diacetone acrylamide, acrylic acid and methacrylic acid, 2-hydroxyethyl acrylate and methacrylate, diethylene glycol monoacrylate and monomethacrylate, triethylene glycol monoacrylate and monomethacrylate, polyethylene glycol monoacrylate and monomethacrylate (molecular weight of polyethylene glycol is from 194 to about 9,000) 2-hydroxypropyl acrylate ethyl methacrylate
aminoethylam...
N-vinyl...
...ol di...
...ery...
pro...

as the former Example 2. The result of measurement on the contact angle with water is shown in the following Table 1.

EXAMPLE 4

A 10% solution of acrylonitrile-styrene copolymer (acrylonitrile: styrene =55:45, number average molecular weight: 100,000) in toluene was prepared and it was applied to the surface of a glass plate. The resulting dried cast film was applied with the same acrylamide solution as that of Example 2, treated in like manner as Example 2 and the contact angles with water were measured, the results of which are shown in the following Table 1.

EXAMPLE 5

A solution was prepared by dissolving 40 g of acrylamide and 2 g of benzoin propyl ether into 60 g of methanol. This solution was applied to the surface of the same substrate as that in Example 3 and it was treated in like manner as Example 2. The result of measurement of contact angle with water is shown in the following Table 1.

EXAMPLE 6

A solution was prepared by dissolving 40 g of acrylamide and 2 g of benzophenone into 60 g of acetone. This solution was applied to the surface of a polypropylene film (trademark: "Polypro F600" made by Mitsui Petrochemical Industries, Ltd., in Japan) and it was then treated in like manner as Example 2. The contact angle with water was measured, the result of which is shown in the following Table 1. Further, it was confirmed by infrared absorption spectrum that the added acrylamide is not released when the treated film is immersed into boiling water for 24 hours.

EXAMPLE 7

The same substrate as that of Example 3 was applied with 2-hydroxyethyl methacrylate containing 5% of benzophenone. Irradiation was then carried out for 20 minutes through the layer of 2-hydroxyethyl methacrylate by using a low pressure mercury lamp (50 W) which was placed at 5 cm distance apart. After the irradiation, it was immersed in running water for 64 hours and dried. The contact angle with water was then measured, the result of which is shown in Table 1.

EXAMPLE 8

A solution was prepared by dissolving 10 g of 2-hydroxyethyl methacrylate, 1 g of maleic anhydride and 0.5 g of benzophenone in 9 g of methyl isobutyl ketone, and the solution was applied to the surface of the same substrate as that in Example 3. Then it was treated in like manner as Example 7 and the contact angle with water was measured, the result of which is shown in the following Table 1.

EXAMPLE 9

A solution was prepared by dissolving 40 g of N-methylol acrylamide and 2 g of benzophenone in 60 g of ethanol, and this solution was applied to the surface of the same substrate as that in Example 3. It was then irradiated for 5 minutes in like manner as Example 2. After the irradiation, it was rinsed with water and dried. The contact angle with water of the treated surface was measured, the result of which is shown in the following Table 1.

EXAMPLE 10

A 20μ film of low density polyethylene (trademark: "Petrosen" made by Japan Polychemical Co., Ltd. in Japan: branched polymer of ethylene) was applied with the same acrylamide solution as that of Example 2 and treated and tested in like manner as the former Example 2. The result of measurement on the contact angle with water is shown in the following Table 1.

EXAMPLE 11

A solution was prepared by dissolving 20 g of Epikote #1004, and 1 g of 2-ethyl 4-methyl imidazole in 60 g of methyl ethyl ketone. The solution was applied to the surface of a glass plate, and dried for 10 minutes at 160° C. Further, the dried cast film (thickness: 30μ) of epoxy resin was applied with acryl amide solution as that of Example 2. Then they were treated in like manner as Example 2 and the contact angles with water were measured, the results of which are shown in the following Table 1.

EXAMPLE 12

A polyester resin (MW: 10,000) was prepared by condensation reaction of phthalic anhydride/1,2-propylene glycol (148/76) in 3-methoxy butyl acetate for 4 hrs at 180° C. The polyester resin solution was applied to the surface of a glass plate, and dried for 30 minutes at 60° C.

Further, the dried cast film (thickness: 15μ) of polyester resin was applied with acrylamide solution as that of Example 2. Then, they were treated in like manner as Example 2 and the contact angles with water were measured, the results of which are shown in the following Table 1.

EXAMPLE 13

A solution was prepared by dissolving 63 g of hexamethylene diisocyanate and 38 g 1,2-propylene glycol in 200 g of acetone. The solution was applied to the surface of a glass plate, and dried for 30 minutes at 80° C.

Further, the dried cast film (thickness: 30μ) of epoxy resin was applied with acryl amide solution as that of Example 2. Then, they were treated in like manner as Example 2 and the contact angles with water were measured, the results of which are shown in the following Table 1.

EXAMPLE 14

An unsaturated polyester resin (MW: about 12,000) was prepared by condensation reaction of tetrahydrophthalic anhydride/ethylene glycol (152/62) in 3-methoxy butyl acetate for 4 hrs at 180° C. The polyester resin solution was applied to the surface of a glass plate, and dried for 30 minutes at 60° C. Further, the dried cast film (thickness: 15μ) of polyester resin was applied with acrylamide solution as that of Example 2. Then, they were treated in like manner as Example 2 and the contact angles with water were measured, the results of which are shown in the following Table 1.

TABLE 1

| Example No. | Contact Angle between Water and Untreated Substrate | Contact Angle between Water and Treated Substrate |
| --- | --- | --- |
| Example 1 | 90 degrees | 62 degrees |
| Example 2 | 90 " | 57 " |

TABLE 1-continued

| Example No. | Contact Angle between Water and Untreated Substrate | Contact Angle between Water and Treated Substrate |
|---|---|---|
| Example 3 | 88 " | 31 " |
| Example 4 | 98 " | 41 " |
| Example 5 | 88 " | 36 " |
| Example 6 | 105 " | 80 " |
| Example 7 | 88 " | 40 " |
| Example 8 | 88 " | 39 " |
| Example 9 | 88 " | 31 " |
| Example 10 | 101 " | 36 " |
| Example 11 | 85 " | 18 " |
| Example 12 | 77 " | 21 " |
| Example 13 | 95 " | 12 " |
| Example 14 | 92 " | 16 " |

Remarks:

(i) Measurement of Contact Angle: 10μ liter of distilled water was dropped on the substrate and after 1 minute, the angle between the water surface and the substrate surface was measured by using a telescope (Precision measurement device for contact angle: Model CA-D made by kyowa Kagaku K.K., in Japan).

(2) After the application of polymerizable compounds, when they were rinsed without irradiation, the lowering of contact angles was not observed in any examples.

Although the present invention has been described in connection with preferred examples thereof, many variations and modifications will now become apparent to those skilled in the art. It is preferred, therefore, that the present invention be limited not by the specific disclosure herein, but only by the appended claims.

What is claimed is:

1. A treating method for giving hydrophilic property to the surface of solid hydrophobic polymer substrate without otherwise changing the properties of the substrate which comprises the steps of:
   I. non-mixingly contacting the surface of the hydrophobic polymer substrate having at least 0.05 mol/kg carbon atoms bonded with a single hydrogen atom in its molecule and a contact angle of at least 60° with water with a radically polymerizable compound, the homopolymer of which is soluble and/or swellable in water or in electrolytic solutions said radically polymerizable compound being mixed with a triplet state sensitizer having triplet state energy of 50 Kcal/mol or more or photosensitizer which produces free radicals by irradiation;
   II. irradiating actinic rays of wave length 300–700 nm to said polymer substrate applied with said radically polymerizable compound whereby a radical addition reaction occurs to bond said compound to said substrate; and
   III. rinsing said treated polymer with a non-solvent for a period of time substantially in excess of that required for removal of an unreacted polymerizable compound.

2. A treating method for giving hydrophilic property to the surface of hydrophobic polymer substrate as claimed in claim 1, wherein said radically polymerizable compound is at least one member selected from the group consisting of: maleic anhydride, acrylamide, methacrylamide, N-methyl acrylamide and methacrylamide, N-ethyl acrylamide and methacrylamide, N-propyl acrylamide and methacrylamide, N-butyl acrylamide and methacrylamide, N-2-hydroxyethyl acrylamide and methacrylamide, N,N-methylene bisacrylamide and bismethacrylamide, N-methylolacrylamide, acryl morpholine, methacryl morpholine, N-propyloxy acrylamide, N,N-dimethyl acrylamide and methacrylamide, N,N-diethyl acrylamide and methacrylamide, diacetone acrylamide, acrylic acid, methacrylic acid, 2-hydroxyethyl acrylate and methacrylate, diethylene glycol monoacrylate and monomethacrylate, triethylene glycol monoacrylate and monomethacrylate, polyethylene glycol monoacrylate and monomethacrylate (molecular weight of polyethylene glycol is 300 or more), 2-hydroxypropyl acrylate and methacrylate, 3-hydroxypropyl acrylate and methacrylate, glycerol monoacrylate and monomethacrylate, polyethylene glycol diacrylate and dimethacrylate (molecular weight of polyethylene glycol is 300 or more), N-vinylimidazole, vinylpyridine, N-vinylpiperidone, N-vinylcaprolactam, N-vinylpyrrolidone, 2-dimethylaminoethyl acrylate and methacrylate, 2-dimethylamino acrylate and methacrylate, 2-sulfoethyl acrylate and methacrylate, 3-sulfopropyl acrylate and methacrylate, p-styrene sulfonic acid, 2-phosphoric ethylene acrylate and methacrylate, and 2-phosphoric-1-chloromethylethylene acrylate and methacrylate.

3. A treating method for giving hydrophilic property to the surface of hydrophobic polymer substrate as claimed in claim 1, wherein said hydrophobic polymer substrate having, in its molecules, carbon atoms each bonded to a single hydrogen is a linear or three-dimensional polymer having 0.05 mol/kg or more of carbon atoms each bonded to a single hydrogen atom, and a self-supporting property at room temperature.

4. A treating method for giving hydrophilic property to the surface of hydrophobic polymer substrate as claimed in claim 1, wherein said hydrophobic polymer substrate having, in its molecules, carbon atoms each bonded to a single hydrogen is made of one member of polystyrene, polypropylene, polyvinyl chloride, polyvinyl carbazole, polyacrylonitrile, polyacrylic esters, polyvinyl acetate, copolymers of two or more of the monomers used for preparing the above polymers, double- or multiple-component copolymers of one or more of the above monomers with the comonomers such as methacrylic esters, methacrylonitrile, butadiene, isoprene and ethylene, internally crosslinked products of the above polymers, and branched polymers of ethylene, polycarbonate, polyester, epoxy resin and urethane resin.

5. A treating method for giving hydrophilic property to the surface of hydrophobic polymer substrate as claimed in claim 1, wherein the source of said actinic rays is one member of a low pressure mercury lamp, high pressure mercury lamp, fluorescent lamp, xenon lamp, carbon arc lamp, tungsten incandescent lamp and sunlight.

6. A treating method for giving hydrophilic property to the surface of hydrophobic polymer substrate as claimed in claim 1, wherein said substrate is polystyrene and said radically polymerizable compound is maleic anhydride or acrylamide.

7. A treating method for giving hydrophilic property to the surface of hydrophobic polymer substrate as claimed in claim 1, wherein said radically polymerizable compound is acrylamide, 2-hydroxyethyl methacrylate, a mixture of 2-hydroxyethyl methacrylate and maleic anhydride, or N-methylolacrylamide.

8. A treating method for giving hydrophilic property to the surface of hydrophobic polymer substrate as claimed in claim 1, wherein said substrate is a branched polymer of ethylene and said radically polymerizable compound is acrylamide.

9. A treating method for giving hydrophilic property to the surface of hydrophobic polymer substrate as claimed in claim 1, wherein said substrate is a polyolefin.